June 12, 1945.	C. J. WHITING	2,378,117
POWER WINCH
Filed April 24, 1944	2 Sheets-Sheet 1

INVENTOR
Claud J. Whiting
BY
ATTORNEYS

June 12, 1945.  C. J. WHITING  2,378,117
POWER WINCH
Filed April 24, 1944  2 Sheets-Sheet 2

INVENTOR
Claud J. Whiting
BY
ATTORNEYS

Patented June 12, 1945

2,378,117

UNITED STATES PATENT OFFICE 2,378,117

POWER WINCH

Claud J. Whiting, Princeton, Calif.

Application April 24, 1944, Serial No. 532,435

7 Claims. (Cl. 192—18)

This invention relates in general to, and it is an object to provide, an improved power winch, sometimes known as a power control unit. In particular the invention is directed to a power winch adapted to be mounted on a tractor for use to control, by cable, an implement mounted on the tractor or drawn thereby.

A further object of the present invention is to provide a power winch which comprises a rotary drive unit, a rotary driven unit, and a normally engaged brake unit having a fixed part, and a cooperating movable part included in the rotary driven unit; there being a single manually controlled lever, and connecting assembly, operative to engage the drive and driven units and to then release the brake unit, or to independently and separately release the brake unit, selectively.

An additional object is to provide a power winch which comprises a drive shaft and a driven shaft in adjacent axial alinement, a drive disc axially slidably mounted on the drive shaft for rotation therewith, a driven disc axially slidably mounted on the driven shaft for rotation therewith, a brake disc connected in spaced but adjacent unitary relation to the driven disc on the side opposite the drive disc, a fixed annular brake ring mounted between the driven disc and said brake disc unit, said discs and ring all being disposed in concentric facing relation, spring means normally urging the brake disc into frictional holding engagement with the fixed brake ring, the drive and driven discs then being spaced, and manually controlled means to move the drive disc axially into engagement with the driven disc and to then continue axial movement of said engaged discs in a direction to free the brake disc from the brake ring.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
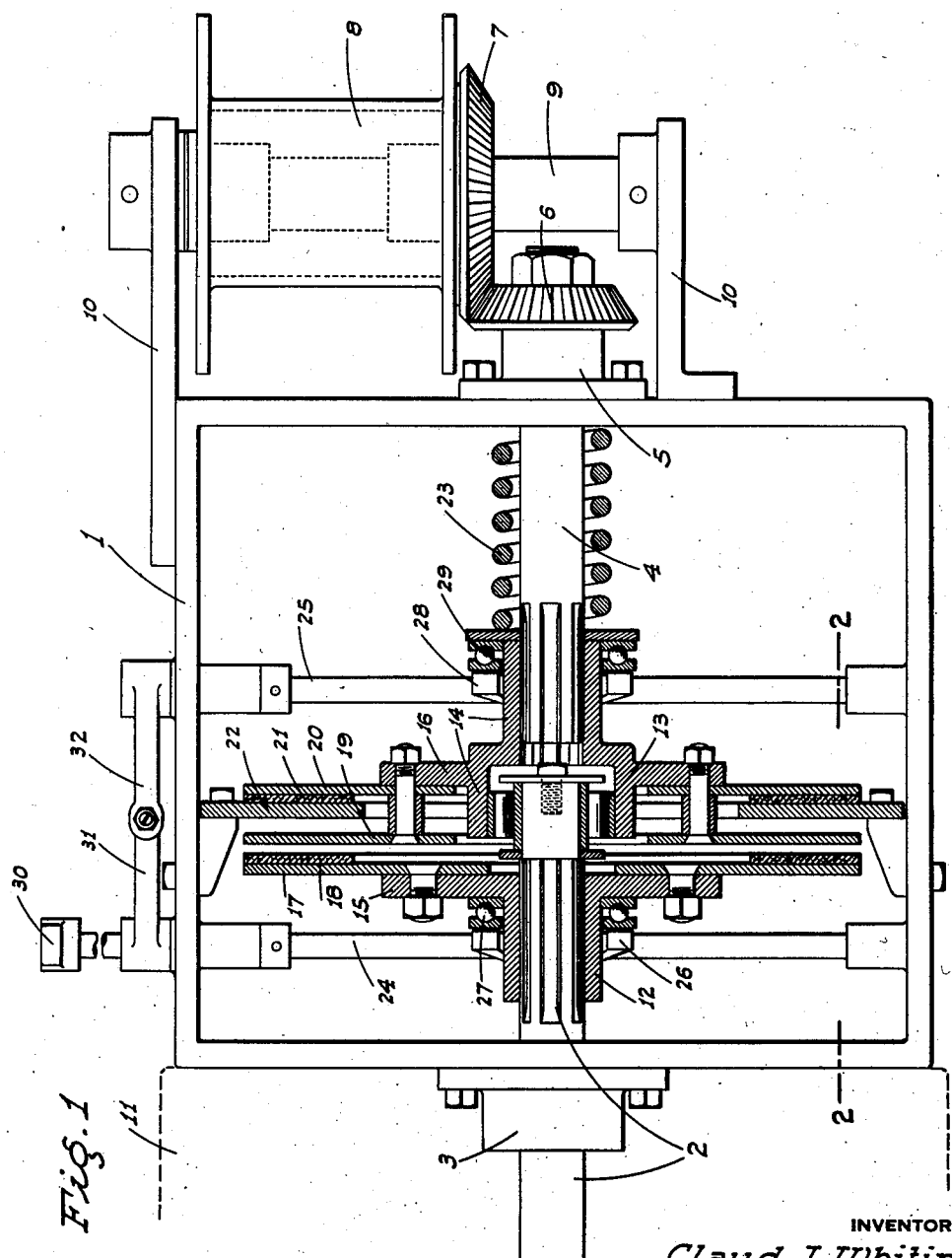
Figure 1 is a plan view, mainly in section, showing the winch in normal position with the brake set.
Figure 2:
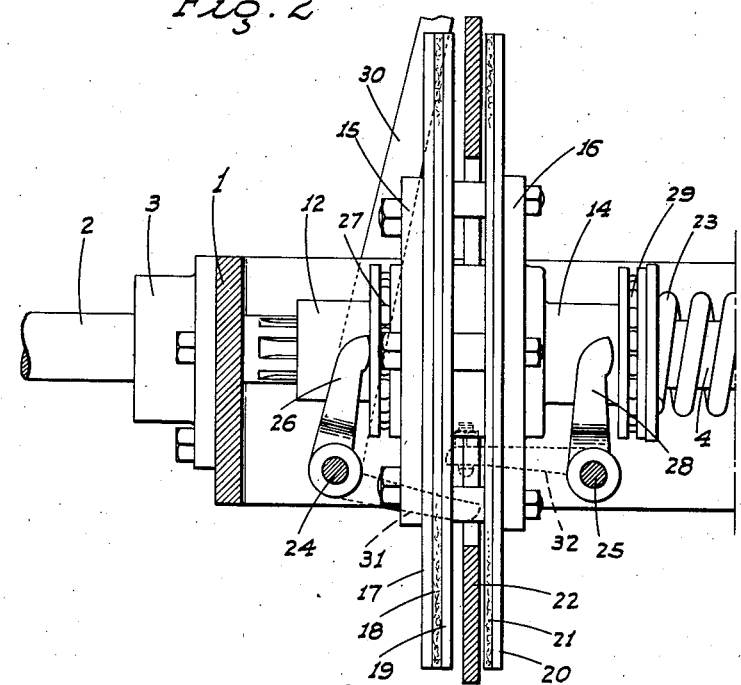
Figure 2 is a fragmentary vertical section on line 2—2 of Fig. 1, showing the driving mechanism engaged and the brake released.
Figure 3:
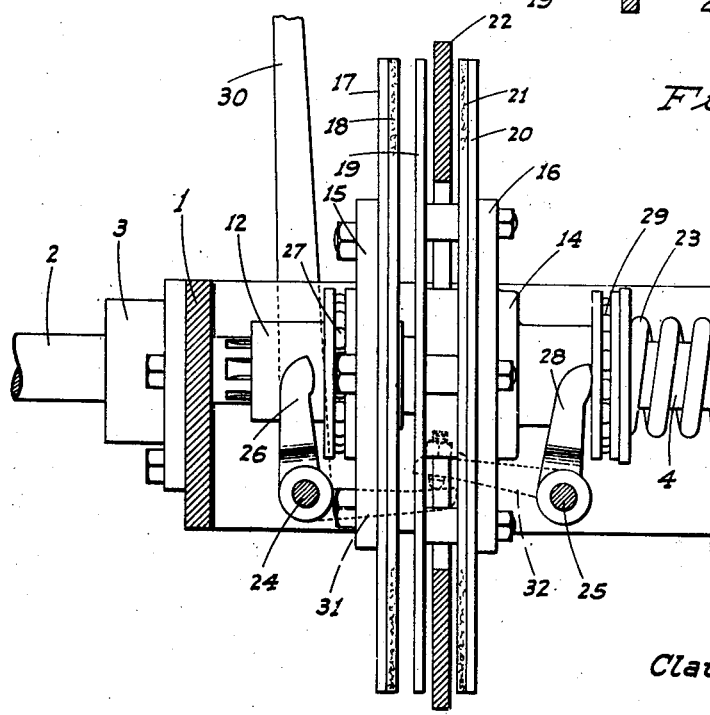
Figure 3 is a similar view, but showing both the brake and the driving mechanism released.

Referring now more particularly to the characters of reference on the drawings, the improved power winch comprises a housing or case 1 having a drive shaft 2 projecting thereinto from one end through a bearing 3. A driven shaft 4 projects into the case 1 from the other end through a bearing 5; the shafts 2 and 4 being disposed in axial alinement and terminating at their inner ends in adjacent but spaced relation.

Exteriorly of the case the driven shaft 4 carries a bevel pinion 6 in mesh with a bevel gear 7 fixed on the end of a cable drum 8 rotatably mounted on a cross shaft 9 supported by brackets 10 which project outwardly from the case 1.

The case 1 is adapted to be rigidly mounted on a tractor 11, the shaft 2 in this instance being the power take-off shaft of the tractor.

A hub 12 is splined on the shaft 2 within the case 1 for rotation with said shaft, and for axial sliding movement therealong, the inner end of shaft 2 beyond the hub 12 being supported by a pilot bearing 13 in the cup-shaped end of another hub 14 which is splined on the adjacent end of the driven shaft 4 for rotation therewith, and for axial sliding movement.

The hubs 12 and 14 are formed with integral, radial flanges 15 and 16, respectively. The flange 15 supports an enlarged drive disc 17 faced with a friction lining 18, while the flange 16 fixedly supports an enlarged driven disc 19 disposed in facing relation to and adapted to cooperate with the disc 17.

A brake disc 20 is supported by the hub 16, in spaced relation, axially of the device, from that side of the disc 19 which is opposite to that side thereof which faces the disc 17. The brake disc 20 is provided with a friction lining 21 on the face adjacent the drive disc 19.

A flat annular brake ring 22 is fixed in the case 1 and projects between the drive disc 19 and brake disc 20. A heavy-duty compression spring 23 surrounds the shaft 4 between hub 14 and the adjacent end of the case, and said spring normally urges the hub 14 in a direction to engage brake disc 20 with brake ring 22, thus normally locking the cable drum 8 against rotation. The control mechanism for the above described winch structure comprises the following:

A pair of cross shafts 24 and 25 are journaled in the case below and in intersecting relation to the hubs 12 and 14, respectively. The cross shaft 24 carries a fork 26 operative, through the medium of a thrust bearing 27, to advance the drive disc 17 toward and into engagement with the driven disc 19. The cross shaft 25 carries a fork 28 operative, through the medium of a thrust bearing 29, to retract the brake disc 20 from the brake ring 22.

At one side of the case the cross shafts 24 and 25 project outwardly of the latter, the shaft 24 being fitted with a radial control lever 30. Radial fingers 31 and 32 are fixed on the projecting end portions of cross shafts 24 and 25, and normally overlap and engage at adjacent ends; the finger 31 being disposed to move free or away from finger 32 upon rotation of shaft 24 in a direction to advance the drive disc 17.

When the lever 30 is swung in a direction to so advance the drive disc 17, such disc first frictionally engages the driven disc 19 in driving relation, causing the latter to begin to rotate, but against the drag of the brake assembly. With continued advancing movement of the drive disc 17 and the engaged driven disc 19, the brake disc 20 moves away from the brake ring 22, and thereafter the winch drives freely from the drive shaft 2 through the driven shaft 4 to the cable drum 8.

It will be seen that immediately upon release or return of the lever 30 to its starting position, the parts of the winch will reassume the neutral position shown in Fig. 1, with the brake unit set and the cable drum 8 held against rotation.

If it is desired to release the brake unit, comprising brake disc 20 and brake ring 22, without engaging the drive mechanism of the winch, the lever 30 is swung in a direction opposite to that required to advance the drive disc 17, whereupon the finger 31 swings the finger 32 in a direction to rotate cross shaft 25 so that the fork 28 advances hub 14 against the compression of spring 23. When this occurs brake disc 20 moves free of brake ring 22, and the cable drum 8 can then be freely rotated, as is sometimes necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A power winch comprising a drive shaft and a driven shaft in adjacent axial alinement, a drive disc axially slidably mounted on the drive shaft for rotation therewith, a driven disc axially slidably mounted on the driven shaft for rotation therewith, a brake disc connected in spaced but adjacent unitary relation to the driven disc on the side opposite the drive disc, a fixed annular brake ring mounted between the driven disc and said brake disc unit, said discs and ring all being disposed in concentric facing relation, spring means normally urging the brake disc into frictional holding engagement with the fixed brake ring, the drive and driven discs then being spaced, and manually controlled means to move the drive disc axially into engagement with the driven disc and to then continue axial movement of said engaged discs in a direction to free the brake disc from the brake ring.

2. A power winch as in claim 1 in which said manually controlled means is operative, selectively, to free the brake disc from the brake ring without engaging the drive and driven discs.

3. A power winch comprising a drive shaft and a driven shaft journaled in axially alined adjacent relation, a drive disc mounted on the drive shaft for rotation therewith and axial sliding movement therealong, a driven disc mounted on the driven shaft for rotation therewith and axial sliding movement therealong a brake disc fixed in connection with but spaced from the driven disc on the side opposite the drive disc, a stationary brake ring extending between the driven disc and brake disc, yieldable means normally urging the brake disc into engagement with the brake ring, and manually controlled means operative to advance the drive disc into engagement with the driven disc and to then continue the advance of said engaged discs whereby to disengage the brake disc from the brake ring.

4. A power winch comprising a drive shaft and a driven shaft journaled in axially alined adjacent relation, a drive disc mounted on the drive shaft for rotation therewith and axial sliding movement therealong, a driven disc mounted on the driven shaft for rotation therewith and axial sliding movement therealong a brake disc fixed in connection with but spaced from the driven disc on the side opposite the drive disc, a stationary brake ring extending between the driven disc and brake disc, yieldable means normally urging the brake disc into engagement with the brake ring, and manually controlled means including a lever movable in one direction to first cause advance of the drive disc into engagement with the driven disc and to then cause release of said brake disc from the brake ring; or movable in the other direction to cause release of said brake disc from the brake ring without engaging said drive and driven discs.

5. A power winch comprising a drive shaft and a driven shaft journaled in axially alined relation, hubs mounted on adjacent ends of said shafts for rotation therewith and axial sliding movement, a drive disc mounted on the hub corresponding to the drive shaft, a driven disc mounted on the hub corresponding to the driven shaft, a brake disc mounted on said last named hub in spaced relation to the driven disc and on the side opposite the drive disc, a fixed brake ring projecting between the driven and brake discs, a compression spring surrounding the driven shaft and normally urging the corresponding hub in a direction to engage the brake disc and brake ring, a fork arranged to advance the drive disc into engagement with the driven disc and to continue said advance and release the brake disc from the brake ring, and manually controlled means to actuate said fork.

6. A power winch as in claim 5 including another fork arranged to retract said brake disc from the brake ring without advancing the drive disc.

7. A power winch as in claim 5 including another fork arranged to retract said brake disc from the brake ring without advancing the drive disc; said control means including a lever swingable in one direction to actuate said first named fork, and swingable in the other direction to independently actuate the other fork.

CLAUD J. WHITING.